United States Patent
Nishizawa et al.

(10) Patent No.: US 11,365,659 B2
(45) Date of Patent: Jun. 21, 2022

(54) DPF REGENERATION CONTROL DEVICE AND DPF REGENERATION CONTROL METHOD

(71) Applicant: MITSUBISHI HEAVY INDUSTRIES ENGINE & TURBOCHARGER, LTD., Sagamihara (JP)

(72) Inventors: Kazuki Nishizawa, Tokyo (JP); Daisuke Sato, Sagamihara (JP)

(73) Assignee: MITSUBISHI HEAVY INDUSTRIES ENGINE & TURBOCHARGER, LTD., Sagamihara (JP)

( * ) Notice: Subject to any disclaimer, the term of this patent is extended or adjusted under 35 U.S.C. 154(b) by 0 days.

(21) Appl. No.: 17/269,071

(22) PCT Filed: Aug. 14, 2019

(86) PCT No.: PCT/JP2019/031899
§ 371 (c)(1),
(2) Date: Feb. 17, 2021

(87) PCT Pub. No.: WO2020/045090
PCT Pub. Date: Mar. 5, 2020

(65) Prior Publication Data
US 2021/0207510 A1    Jul. 8, 2021

(30) Foreign Application Priority Data
Aug. 31, 2018    (JP) .............................. JP2018-162730

(51) Int. Cl.
*F01N 3/00*    (2006.01)
*F01N 3/025*    (2006.01)
(Continued)

(52) U.S. Cl.
CPC ........... *F01N 3/0253* (2013.01); *B01D 46/82* (2022.01); *B01D 53/944* (2013.01);
(Continued)

(58) Field of Classification Search
CPC ........ F01N 3/0253; F01N 3/035; F01N 3/103; F01N 9/002; F01N 2900/1602;
(Continued)

(56) References Cited

U.S. PATENT DOCUMENTS

| 7,325,395 B2 | 2/2008 | Kuboshima et al. |
| 2006/0225409 A1 | 10/2006 | Kuboshima et al. |

(Continued)

FOREIGN PATENT DOCUMENTS

| EP | 2 322 776 B1 | 12/2011 |
| EP | 2 918 801 A1 | 9/2015 |

(Continued)

OTHER PUBLICATIONS

Extended European Search Report dated Mar. 23, 2021 issued in corresponding European Application No. 19854009.8.
(Continued)

*Primary Examiner* — Matthew T Largi
(74) *Attorney, Agent, or Firm* — Birch, Stewart, Kolasch & Birch, LLP

(57) ABSTRACT

An ECU 10 for controlling execution of forced regeneration that removes PM deposited on a DPF by increasing a temperature of the DPF in an exhaust gas treatment device of a diesel engine including a DOC disposed in an exhaust passage and the DPF disposed downstream of the DOC includes: a determination unit 102 for determining whether an injection start condition corresponding to a remaining SOF deposition amount on the DOC is satisfied after the forced regeneration starts and after an upstream temperature of the DOC reaches a predetermined temperature; and an injection execution unit 104 for starting late-post injection of fuel to the DOC when the injection start condition is satisfied.

10 Claims, 4 Drawing Sheets

(51) Int. Cl.
*B01D 53/94* (2006.01)
*F01N 3/035* (2006.01)
*F01N 3/10* (2006.01)
*F01N 9/00* (2006.01)
*B01D 46/82* (2022.01)

(52) U.S. Cl.
CPC ..... *B01D 53/9477* (2013.01); *B01D 53/9495* (2013.01); *F01N 3/035* (2013.01); *F01N 3/103* (2013.01); *F01N 9/002* (2013.01); *B01D 2279/30* (2013.01); *F01N 2900/1602* (2013.01)

(58) Field of Classification Search
CPC .............. B01D 46/0061; B01D 53/944; B01D 53/9477; B01D 53/9495; B01D 2279/30
See application file for complete search history.

(56) References Cited

U.S. PATENT DOCUMENTS

| | | | | |
|---|---|---|---|---|
| 2011/0290217 A1* | 12/2011 | Kimura | ................ | F02D 41/221 123/48 C |
| 2013/0177482 A1 | 7/2013 | Ikawa et al. | | |
| 2015/0260119 A1* | 9/2015 | Nishizawa | ............ | F02D 41/401 60/285 |
| 2016/0222900 A1 | 8/2016 | Nishizawa et al. | | |
| 2018/0320624 A1* | 11/2018 | Okabayashi | .............. | F01N 9/00 |

FOREIGN PATENT DOCUMENTS

| | | | | |
|---|---|---|---|---|
| JP | 4-308309 | A | | 10/1992 |
| JP | 2003269221 | A | * | 9/2003 |
| JP | 2006-291788 | A | | 10/2008 |
| JP | 2010-144525 | A | | 7/2010 |
| JP | 4506539 | B2 | | 7/2010 |
| JP | 2011-69323 | A | | 4/2011 |
| JP | 2011-106340 | A | | 6/2011 |
| JP | 2012-87705 | A | | 5/2012 |
| JP | 2014-218982 | A | | 11/2014 |
| JP | 2014218982 | A | * | 11/2014 |
| JP | 2015-68233 | A | | 4/2015 |
| JP | 2016-223367 | A | | 12/2016 |
| JP | 6203658 | B2 | | 9/2017 |

OTHER PUBLICATIONS

International Preliminary Report on Patentability and Written Opinion of the International Searching Authority for International Application No. PCT/JP2019/031899, dated Mar. 11, 2021, with an English translation.

Office Action dated Mar. 15, 2022 issued in counterpart Japanese Application No. 2018-162730 with a machine translation.

* cited by examiner

DPF REGENERATION CONTROL DEVICE AND DPF REGENERATION CONTROL METHOD

TECHNICAL FIELD

The present disclosure relates to a DPF regeneration control device and a DPF regeneration control method.

BACKGROUND

A diesel engine is equipped with a diesel particulate filter (DPF) system as a post-treatment device to collect and remove particulate matters (PM) in exhaust gas. In the DPF system, a diesel oxidation catalyst (DOC) is arranged on the upstream side, and a DPF is arranged on the downstream side of the exhaust gas flow of the diesel engine. The PM collected by the DPF is removed by forced regeneration through the heating of the DPF when the PM reaches a predetermined amount or at regular intervals. The forced regeneration of the DPF includes automatic regeneration and manual regeneration.

In the forced regeneration, when a threshold for starting the DPF regeneration is reached, the exhaust gas temperature (exhaust temperature) is first raised to a temperature at which the DOC is active (about 250° C.). Thereafter, non-combusted fuel is supplied (late-post injection; LP injection), and oxidation heat is generated by the DOC, so that the exhaust temperature on the upstream side of the DPF rises to about 600° C. The heating to the temperature at which the DOC is active (about 250° C.) is performed by throttling an intake throttle valve or an exhaust throttle valve, or changing the early-post injection amount and injection timing, etc. These controls are performed in accordance with a map according to the rotational speed of the diesel engine and the fuel injection amount. Further, these controls continue even after LP injection until the forced regeneration is completed.

One of techniques relating to the forced regeneration of the DPF is disclosed in Patent Document 1. Patent Document 1 describes that the DPF is heated by LP injection (especially see paragraph 0050).

CITATION LIST

Patent Literature

Patent Document 1: JP2015-68233

SUMMARY

Problems to be Solved

It has been found that, for example in a forklift, since there are many low-load operations with low exhaust temperature, soluble organic fraction (SOF) derived from fuel or lubricating oil is deposited on the DOC with the operating time. However, conventionally, regardless of the SOF deposition amount, when the temperature at which the DOC is active is reached, LP injection is started after the lapse of a certain time. Therefore, if the SOF deposition amount is large, the heating to the temperature at which the DOC is active causes a significant temperature rise on the downstream side of the DOC (upstream side of the DPF) due to the heat generated by oxidation of the SOF. As a result, immediately after the start of LP injection, the heating due to oxidation of the SOF by the DOC and the heating due to LP injection proceed at the same time, so that the temperature on the upstream side of the DPF tends to overshoot. The overshooting of the temperature on the upstream side of the DPF causes abnormal combustion of soot deposited on the DPF, so that the DPF may be damaged by excessive temperature rise of the DPF.

At least one embodiment of the present invention was made in view of the above problems. An object thereof is to provide a DPF regeneration control device and a DPF regeneration control method whereby it is possible to suppress excessive temperature rise of the DPF.

Solution to the Problems (1) A DPF regeneration control device according to at least one embodiment of the present invention is for controlling execution of forced regeneration that removes PM deposited on a DPF by increasing a temperature of the DPF in an exhaust gas treatment device of a diesel engine including a DOC disposed in an exhaust passage and the DPF disposed downstream of the DOC. The DPF regeneration control device includes: a determination unit for determining whether an injection start condition corresponding to a remaining SOF deposition amount on the DOC is satisfied after the forced regeneration starts and after an upstream temperature of the DOC reaches a predetermined temperature; and an injection execution unit for starting late-post injection of fuel to the DOC when the injection start condition is satisfied.

With the above configuration (1), even when the upstream temperature of the DOC reaches a predetermined temperature at which the late-post injection should be performed, the late-post injection is waited until the injection start condition is satisfied thereafter, so that the start of the late-post injection can be delayed. Thus, by setting an appropriate injection start condition such that the late-post injection is performed after SOF oxidation heat generation at the DOC has settled down, it is possible to suppress excessive temperature rise of the DPF.

(2) In some embodiments, in the above configuration (1), the DPF regeneration control device further includes a deposition condition determination unit for determining whether a deposition condition that a SOF deposition amount on the DOC exceeds a predetermined deposition amount is satisfied.

With the above configuration (2), even when the SOF deposition amount on the DOC is large, and the amount of generated heat is large, excessive temperature rise of the DPF can be suppressed by delaying the start of the late-post injection. Further, when the SOF deposition amount on the DOC is small, the late-post injection is immediately performed, so that the forced regeneration can be promptly performed.

(3) In some embodiments, in the above configuration (2), the deposition condition determination unit is configured to determine whether the deposition condition is satisfied, based on a SOF deposition index obtained by multiplying a weighting coefficient set according to the upstream temperature of the DOC by an operating time of the diesel engine.

With the above configuration (3), since the SOF deposition index considering the operating time of the diesel engine can be calculated, the SOF deposition amount can be accurately estimated. As a result, the late-post injection can be started based on an appropriate SOF deposition amount, so that it is possible to more reliably suppress excessive temperature rise of the DPF.

(4) In some embodiments, in the above configuration (3), with a reference temperature on an upstream side of the DOC as a boundary, the weighting coefficient includes a negative weighting coefficient when the upstream temperature is higher than the reference temperature, and the weighting coefficient includes a positive weighting coefficient when the upstream temperature is lower than the reference temperature.

With the above configuration (4), when the SOF is likely to volatilize since the upstream temperature of the DOC is higher than the reference temperature, the SOF deposition amount can be evaluated in consideration of a decrease in SOF caused by the volatilization. As a result, the late-post injection can be started based on an appropriate SOF deposition amount, so that it is possible to more reliably suppress excessive temperature rise of the DPF.

(5) In some embodiments, in any one of the above configurations (1) to (4), the injection start condition includes a first injection start condition that a time from when the upstream temperature of the DOC reaches a first temperature to when the late-post injection starts is equal to or longer than a delay time set according to the remaining SOF deposition amount on the DOC.

With the above configuration (5), the delay time required to sufficiently reduce the amount of heat due to oxidation of SOF can be set. Specifically, for example, the larger the SOF deposition amount, the longer the delay time can be set. As a result, the start of the late-post injection can be delayed until the amount of oxidation heat is sufficiently reduced, so that excessive temperature rise of the DPF can be suppressed.

(6) In some embodiments, in any one of the above configurations (1) to (5), the injection start condition includes at least one of: a second injection start condition that a downstream temperature of the DOC is equal to or lower than a second temperature; or a third injection start condition that a temperature difference between the upstream temperature and the downstream temperature of the DOC is equal to or lower than a third temperature.

With the above configuration (6), the second temperature can be set such that the amount of oxidation heat at the DOC is sufficiently reduced. By performing the late-post injection when the downstream temperature of the DOC (i.e., DPF upstream temperature) drops to the second temperature, excessive temperature rise of the DPF can be suppressed. Further, the third temperature can be set such that heat is hardly generated due to oxidation at the DOC. By performing the late-post injection when the temperature difference between the upstream temperature and the downstream temperature of the DOC is equal to or lower than the third temperature, excessive temperature rise of the DPF can be suppressed.

(7) In some embodiments, in the above configuration (6), at least one of the second temperature or the third temperature includes a temperature that is reached when the downstream temperature of the DOC rises due to start of the forced regeneration and then drops.

With the above configuration (7), the late-post injection can be started when the downstream temperature of the DOC rises and then drops, which is considered to be a sufficient decrease in remaining SOF deposition amount due to oxidation heat generation. Thus, it is possible to suppress the overheating of the downstream temperature of the DOC, and suppress excessive temperature rise of the DPF.

(8) In some embodiments, in any one of the above configurations (1) to (7), the injection execution unit is configured to perform FF control of a fuel injection amount until a switching condition is satisfied, and the injection execution unit is configured to switch to FB control when the switching condition is satisfied.

With the above configuration (8), even if a temperature peak occurs in the initial stage of SOF oxidation heat generation at the DOC, it is possible to suppress excessive temperature rise of the DPF by the FF control. Further, since the FB control is performed when the switching condition is satisfied, it is possible to control the upstream temperature of the DPF in response to environmental changes such as the operating state of the diesel engine, and it is possible to suppress excessive temperature rise of the DPF.

(9) In some embodiments, in the above configuration (8), the switching condition includes at least one of: a first switching condition that a predetermined switching time elapses from start of injection of the fuel; or a second switching condition that an upstream temperature of the DPF reaches a predetermined switching temperature.

With the above configuration (9), the control can be switched to FB control when the degree of temperature rise due to the start of the late-post injection becomes moderate to some extent, so that it is possible to control the upstream temperature of the DPF in response to environmental changes such as the operating state of the diesel engine, and it is possible to suppress excessive temperature rise of the DPF.

(10) In some embodiments, in the above configuration (8) or (9), the injection execution unit is configured to perform the FF control again when a temperature difference between the upstream temperature of the DPF and a target temperature exceeds a fourth temperature after the FB control starts.

With the above configuration (10), the fourth temperature can be set so as to be able to determine that the upstream temperature of the DPF comes close to the target temperature. Thus, even if a temperature peak occurs in the initial stage of SOF oxidation heat generation at the DOC, by returning to the FF control when the temperature difference between the upstream temperature of the DPF and the target temperature exceeds the fourth temperature, it is possible to suppress excessive temperature rise of the DPF.

(11) A DPF regeneration control method according to at least one embodiment of the present invention is for controlling execution of forced regeneration that removes PM deposited on a DPF by increasing a temperature of the DPF in an exhaust gas treatment device of a diesel engine including a DOC disposed in an exhaust passage and the DPF disposed downstream of the DOC. The DPF regeneration control method includes: a determination step of determining whether an injection start condition corresponding to a remaining SOF deposition amount on the DOC is satisfied after the forced regeneration starts and after an upstream temperature of the DOC reaches a predetermined temperature; and an injection execution step of starting late-post injection of fuel to the DOC when the injection start condition is satisfied.

With the above method (11), even when the upstream temperature of the DOC reaches a predetermined temperature at which the late-post injection should be performed, the late-post injection is waited until the injection start condition is satisfied thereafter, so that the start of the late-post injection can be delayed. Thus, by setting an appropriate injection start condition such that the late-post injection is performed after SOF oxidation heat generation at the DOC has settled down, it is possible to suppress excessive temperature rise of the DPF.

Advantageous Effects

At least one embodiment of the present invention provides a DPF regeneration control device and a DPF regeneration control method whereby it is possible to suppress excessive temperature rise of the DPF.

DETAILED DESCRIPTION

Figure 1:
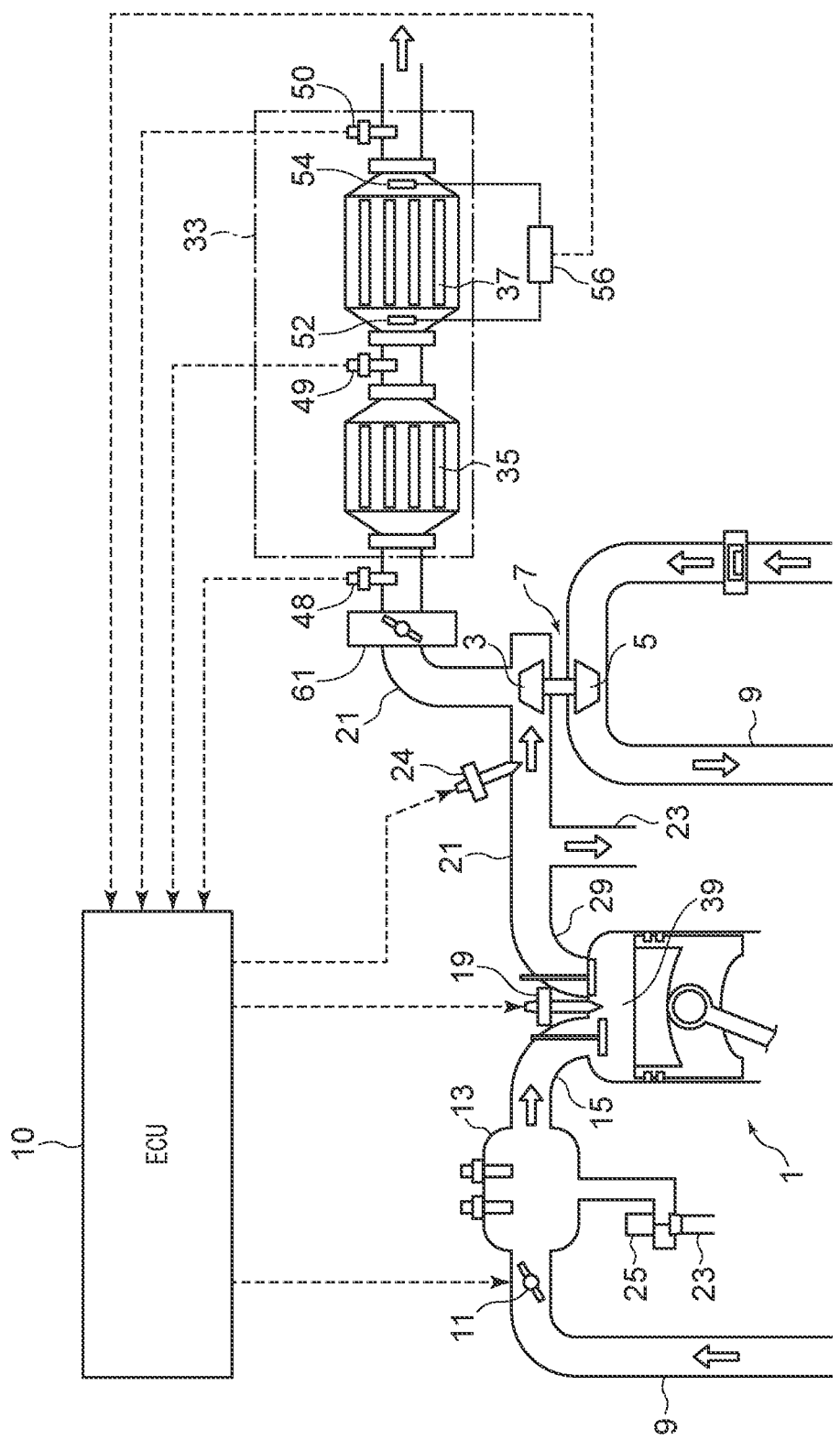
FIG. 1 is an overall configuration diagram of an exhaust gas treatment device of a diesel engine according to an embodiment of the present invention.

Embodiments of the present invention will now be described in detail with reference to the accompanying drawings. However, the following embodiments and the drawings are illustrative only, and various modifications may be applied as long as they do not depart from the object of the present invention. Further, two or more embodiments may be optionally combined in any manner. Further, in the following embodiments, similar elements will be indicated by the same reference numerals, and redundant descriptions thereof will be omitted for convenience.

It is intended, however, that unless particularly specified, dimensions, materials, shapes, relative positions and the like of components described in the embodiments shall be interpreted as illustrative only and not intended to limit the scope of the present invention.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain" and "constitute" are not intended to be exclusive of other components.

FIG. 1 is an overall configuration diagram of an exhaust gas treatment device of a diesel engine 1 according to an embodiment of the present invention. The exhaust gas treatment device shown in FIG. 1 is an exhaust gas treatment device of a diesel engine 1 including a DOC 35 disposed in an exhaust passage 21 and a DPF 37 disposed downstream of the DOC 35.

The downstream side of the diesel engine 1 is connected to an exhaust passage 21. The exhaust passage 21 is provided with an exhaust gas treatment device 33 including a DOC 35 and a DPF 37 disposed downstream of the DOC 35. The DOC 35 has a function of oxidizing and removing non-combusted fuel (HC) and carbon monoxide (CO) in exhaust gas, and oxidizing nitrogen monoxide (NO) in exhaust gas to produce nitrogen dioxide ($NO_2$). Further, in the DOC 35, exhaust gas passing therethrough is heated by oxidation heat of injected fuel, so that the upstream temperature (e.g., inlet temperature) of the DPF 37 increases. The DPF 37 is a device for collecting the PM such as soot contained in exhaust gas with a filter to remove the PM from the exhaust gas.

The upstream side of the diesel engine 1 is connected to an intake passage 9 via an intake manifold 13. Between the intake passage 9 and the exhaust passage 21, an exhaust turbocharger 7 is disposed. The exhaust turbocharger 7 includes an exhaust turbine 3 disposed in the exhaust passage 21 and a compressor 5 disposed in the intake passage 9. The compressor 5 is coaxially driven by the exhaust turbine 3. Further, an inter cooler (not shown) and an intake throttle valve 11 are disposed in the intake passage 9. The opening degree of the intake throttle valve 11 is controlled by an ECU 10, which will be described later. After the inter cooler cools the compressed intake air discharged from the compressor 5, the intake throttle valve 11 controls the intake air flow rate, and the compressed intake air flows into a combustion chamber 39 of each cylinder of the diesel engine 1 through an intake port 15.

The diesel engine 1 has a fuel injection valve 19 for injecting high-pressure fuel to the combustion chamber 39. The fuel injection valve 19 is connected to a common rail (not shown) in which the high-pressure fuel accumulates, and the ECU 10 described later controls the injection timing and the fuel injection amount thereof. The high-pressure fuel injected into the combustion chamber 39 is mixed with the above-described intake air, and is then combusted in the combustion chamber 39.

At a position immediately downstream of the exhaust port 29 of the exhaust passage 21, an EGR pipe 23 branches from the exhaust passage 21. The EGR pipe 23 is connected to the intake manifold 13 disposed downstream of the intake throttle valve 11. Further, an EGR valve 25 is disposed in the EGR pipe 23. By controlling the EGR valve 25, a part of exhaust gas discharged from the diesel engine 1 passes through the EGR pipe 23 and recirculates through the diesel engine 1.

The exhaust gas discharged from the diesel engine 1 drives the exhaust turbine 3 and coaxially drives the compressor 5. Then, after passing through the exhaust passage 21, the exhaust gas flows into the DOC 35 and the DPF 37 of the exhaust gas treatment device 33. The exhaust passage 21 has an exhaust throttle valve 61.

When the exhaust gas flows into the exhaust gas treatment device 33, non-combusted fuel and carbon monoxide in the exhaust gas are oxidized and removed by the DOC 35. Then, the PM contained in the exhaust gas is removed by the DPF 37, and the exhaust gas from which the PM has been removed is discharged to the outside of the engine.

A part of the PM removed by the DPF 37 is regenerated by $NO_2$ produced by oxidizing NO in the exhaust gas of the engine during operation with the DOC 35 (natural regeneration), while the remainder of the PM deposits on a filter (not shown) of the DPF 37. If the PM deposition progresses excessively, the PM collecting capacity may decrease, and the engine output may decrease due to an increase in back pressure. Therefore, in the exhaust gas treatment device 33 including the DPF 37, forced regeneration that regenerates the filter by forcibly combusting the deposited PM is executed at an appropriate timing.

The forced regeneration includes at least two types of regeneration: automatic regeneration executed by the ECU 10 automatically; and manual regeneration executed manually by an operator, for example. The automatic regeneration is automatically executed if predetermined forced regeneration execution conditions are satisfied, regardless of whether the vehicle (not shown) is moving or stopped. Meanwhile, the manual regeneration is executed by, for instance, button operation of an operator, basically while the vehicle is stopped. Thus, the regeneration temperature of the manual regeneration is controlled to be higher than that of the automatic regeneration. For example, the upstream temperature of the DPF 37 is controlled to be 600° C. to 610° C. in the automatic regeneration, while the same is controlled to be 620° C. to 630° C. in the manual regeneration.

The temperature rise control can be performed by adjusting the opening degree of the exhaust throttle valve 61. Specifically, the exhaust temperature can be increased by throttling the exhaust throttle valve 61 (decreasing the opening degree). The temperature rise control can be performed by, in addition to or instead of the opening adjustment of the exhaust throttle valve 61, the opening adjustment of the intake throttle valve 11.

The exhaust passage 21 is provided with various sensors such as a DOC upstream temperature sensor 48, a DPF upstream temperature sensor 49, a DPF downstream temperature (e.g., outlet temperature) sensor 50, a DPF upstream pressure sensor 52, a DPF downstream pressure sensor 54, a DPF differential pressure sensor 56, and a back pressure sensor (not shown). Signals relating to the DOC inlet temperature, DPF inlet temperature, DPF outlet temperature, DPF differential pressure, etc., measured by these sensors are input to the ECU 10.

The ECU 10 includes a CPU (Central Processing Unit), a ROM (Read Only Memory, for example, EEPROM, Flash ROM, etc.), a RAM (Random Access Memory), an I/F (Interface), although not depicted. The ECU 10 is implemented by executing a predetermined control program stored in the ROM with the CPU.

Figure 2:
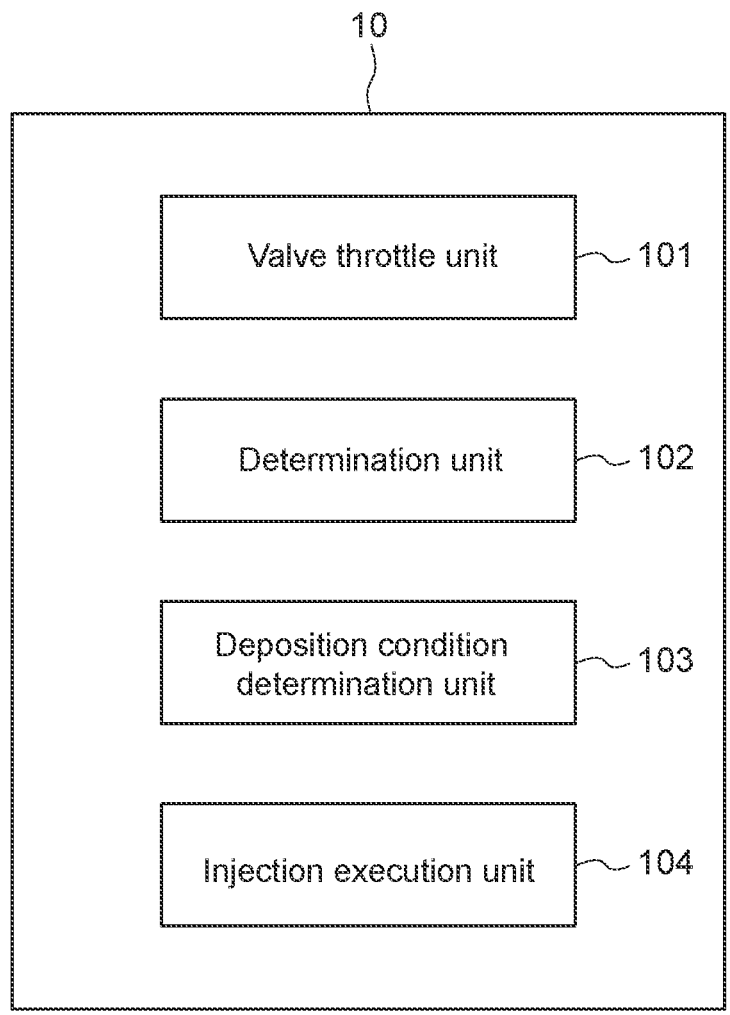
FIG. 2 is a block diagram for describing a function of an ECU.

FIG. 2 is a block diagram for describing a function of the ECU 10. The ECU 10 (DPF regeneration control device) is for controlling execution of forced regeneration that removes the PM deposited on the DPF 37 by increasing the temperature of the DPF 37. The ECU 10 includes a valve throttle unit 101, a determination unit 102, a deposition condition determination unit 103, and an injection execution unit 104.

The valve throttle unit 101 is for limiting the valve opening of at least one of the intake throttle valve 11 or the exhaust throttle valve 61 at the start of the forced regeneration. When the valve opening is limited, the exhaust temperature to the DOC 35 rises.

The determination unit 102 is for determining whether an injection start condition is satisfied after the forced regeneration of the DPF 37 starts and after the upstream temperature of the DOC 35 reaches a predetermined temperature (e.g., 250° C.). Conventionally, the late-post injection is performed at the time when the upstream temperature of the DOC 35 reaches a predetermined temperature. However, in an embodiment of the present invention, even when the upstream temperature of the DOC 35 reaches a predetermined temperature, the start of the late-post injection is waited until the injection start condition is satisfied. Accordingly, in an embodiment of the present invention, after the upstream temperature of the DOC 35 reaches a predetermined temperature, the start of the late-post injection is delayed until the injection start condition is satisfied.

The injection start condition corresponds to the remaining SOF deposition amount on the DOC 35 for starting the late-post injection (LP injection). Specifically, in an embodiment of the present invention, the injection start condition includes a first injection start condition that a time from when the upstream temperature of the DOC 35 reaches a first temperature to when the late-post injection starts is equal to or longer than a delay time set according to the remaining SOF deposition amount on the DOC 35.

When the injection start condition includes the first injection start condition, the delay time required to sufficiently reduce the amount of heat due to oxidation of SOF can be set. Specifically, for example, the larger the SOF deposition amount, the longer the delay time can be set. Conversely, for example, the smaller the SOF deposition amount, the shorter the delay time can be set. As a result, the start of the late-post injection can be delayed until the amount of oxidation heat is sufficiently reduced, so that excessive temperature rise of the DPF 37 can be suppressed. The correlation between the SOF deposition amount and the delay time can be stored as a map in the determination unit 102, for example.

Further, in an embodiment of the present invention, the injection start condition includes at least one of: a second injection start condition that the downstream temperature of the DOC 35 is equal to or lower than a second temperature; or a third injection start condition that a temperature difference between the upstream temperature and the downstream temperature of the DOC 35 is equal to or lower than a third temperature. When the injection start condition includes at least one of the second injection start condition or the third injection start condition, the second temperature can be set such that the amount of oxidation heat at the DOC 35 is sufficiently reduced. By performing the late-post injection when the downstream temperature of the DOC 35 (i.e., upstream temperature of DPF 37) drops to the second temperature, excessive temperature rise of the DPF 37 can be suppressed. Further, the third temperature can be set such that heat is hardly generated due to oxidation at the DOC 35. By performing the late-post injection when the temperature difference between the upstream temperature and the downstream temperature of the DOC 35 is equal to or lower than the third temperature, excessive temperature rise of the DPF 37 can be suppressed.

Further, in an embodiment of the present invention, at least one of the second temperature in the second injection start condition or the third temperature in the third injection start condition includes a temperature that is reached when the downstream temperature of the DOC 35 rises due to the start of the forced regeneration and then drops. That is, at least one of the second temperature or the third temperature includes a temperature that is reached in the course of, after the downstream temperature of the DOC 35 rises once due to SOF oxidation heat generation at the DOC 35 and a temperature peak is detected, dropping the downstream temperature with a decrease in remaining SOF deposition amount. With this configuration, the late-post injection can be started when the downstream temperature of the DOC 35 rises and then drops, which is considered to be a sufficient decrease in remaining SOF deposition amount due to oxidation heat generation. Thus, it is possible to suppress the overheating of the downstream temperature of the DOC 35, and suppress excessive temperature rise of the DPF 37.

The deposition condition determination unit 103 is for determining whether a deposition condition that the SOF deposition amount on the DOC 35 exceeds a predetermined deposition amount is satisfied. Further, the injection execution unit 104, which will be described later, is configured to start the late-post injection of fuel into the DOC 35 when the deposition condition is satisfied, as described later in detail. Thus, in an embodiment of the present invention, only when the SOF deposition amount on the DOC 35 is large (when exceeding a predetermined amount), the late-post injection is started with a delay.

With this configuration, even when the SOF deposition amount on the DOC 35 is large, and the amount of generated heat is large, excessive temperature rise of the DPF 37 can be suppressed by delaying the start of the late-post injection. Further, when the SOF deposition amount on the DOC 35 is small, the late-post injection is immediately performed, so that the forced regeneration can be promptly performed.

The SOF deposition amount on the DOC 35 constituting the deposition condition may be directly calculated, or in an embodiment of the present invention, may be estimated as follows. Specifically, for example, the deposition condition determination unit 103 can evaluate that the SOF deposition amount is large when a continuous time during which the upstream temperature of the DOC 35 is equal to or lower than a predetermined temperature is equal to or longer than a predetermined time. Alternatively, for example, the deposition condition determination unit 103 can evaluate that the SOF deposition amount is large when the proportion of time when the diesel engine 1 is under low-load operation (torque or fuel injection amount is equal to or less than a predetermined value) or the proportion of time when the exhaust temperature is equal to lower than a predetermined temperature is equal to or more than a predetermined value.

Further, the deposition condition determination unit 103 may be configured to determine whether the deposition condition is satisfied, based on a SOF deposition index obtained by multiplying a weighting coefficient set according to the upstream temperature of the DOC 35 by the operating time (e.g., cumulative operating time or the last certain operating time) of the diesel engine 1. With this configuration, since the SOF deposition index considering the operating time of the diesel engine can be calculated, the SOF deposition amount can be accurately estimated. As a result, the late-post injection can be started based on an appropriate SOF deposition amount, so that it is possible to more reliably suppress excessive temperature rise of the DPF 37. The weighting coefficient can be determined, for example, based on a map relating to correlation between the upstream temperature of the DOC 35 and the weighting coefficient stored in the deposition condition determination unit 103.

For example, the higher the upstream temperature of the DOC 35, the smaller the weighting coefficient can be set. Particularly, in an embodiment of the present invention, with a reference temperature on the upstream side of the DOC 35 as a boundary, the weighting coefficient includes a negative weighting coefficient when the upstream temperature is higher than the reference temperature, and includes a positive weighting coefficient when lower than the reference temperature. With this configuration, when the SOF is likely to volatilize since the upstream temperature of the DOC 35 is higher than the reference temperature, the SOF deposition amount can be evaluated in consideration of a decrease in SOF caused by the volatilization. As a result, the late-post injection can be started based on an appropriate SOF deposition amount, so that it is possible to more reliably suppress excessive temperature rise of the DPF 37.

The injection execution unit 104 is for starting the late-post injection of fuel into the DOC 35 when the deposition condition is satisfied. In an embodiment of the present invention, the injection execution unit 104 is configured to perform FF control of the fuel injection amount until a switching condition is satisfied, and switch to FB control when the switching condition is satisfied. That is, FF control (feedforward control) is performed immediately after the start of the late-post injection, and when the switching condition is satisfied, the control is switched to FB control (feedback control). The fuel injection amount to be injected in the FF control of the fuel injection amount may be determined according to the amount of heat determined based on the exhaust gas flow rate and the temperature difference between the upstream side and the downstream side of the DOC 35, for example.

With this configuration, even if a temperature peak occurs in the initial stage of SOF oxidation heat generation at the DOC 35, it is possible to suppress excessive temperature rise of the DPF 37 by the FF control. Further, since the FB control is performed when the switching condition is satisfied, it is possible to control the upstream temperature of the DPF 37 in response to environmental changes such as the operating state of the diesel engine 1, and it is possible to suppress excessive temperature rise of the DPF 37.

The switching condition includes, for example, at least one of: a first switching condition that a predetermined switching time elapses from the start of injection of fuel; or a second switching condition that the upstream temperature of the DPF 37 reaches a predetermined switching temperature. With this configuration, the control can be switched to FB control when the degree of temperature rise due to the start of the late-post injection becomes moderate to some extent, so that it is possible to control the upstream temperature of the DPF 37 in response to environmental changes such as the operating state of the diesel engine 1, and it is possible to suppress excessive temperature rise of the DPF 37.

Further, the injection execution unit 104 is configured to perform the FF control again when a temperature difference between the upstream temperature of the DPF 37 and a target temperature exceeds a fourth temperature after the FB control starts. That is, the fourth temperature can be set so as to be able to determine that the upstream temperature of the DPF 37 comes close to the target temperature. Thus, even if a temperature peak occurs in the initial stage of SOF oxidation heat generation at the DOC 35, by returning to the FF control after the start of the FB control when the temperature difference between the upstream temperature of the DPF 37 and the target temperature exceeds the fourth temperature, it is possible to suppress excessive temperature rise of the DPF 37.

With the ECU 10 (DPF regeneration control device) having the above configuration, even when the upstream temperature of the DOC 35 reaches a predetermined temperature at which the late-post injection should be performed, the late-post injection is waited until the injection start condition is satisfied thereafter, so that the start of the late-post injection can be delayed. Thus, by setting an appropriate injection start condition such that the late-post injection is performed after SOF oxidation heat generation at the DOC 35 has settled down, it is possible to suppress excessive temperature rise of the DPF.

In particular, the upstream temperature controllability of the DPF 37 is improved even during regeneration after a long period of low-load operation in which a large amount of SOF is deposited on the DOC 35, and the risk of combustion of the DPF 37 due to excessive temperature rise of the DPF 37 can be reduced. As a result, the regeneration interval can be extended by increasing the allowable soot deposition amount on the DPF 37, so that the fuel consumption can be improved, and the oil dilution risk can be reduced by reducing the regeneration frequency.

Figure 3:
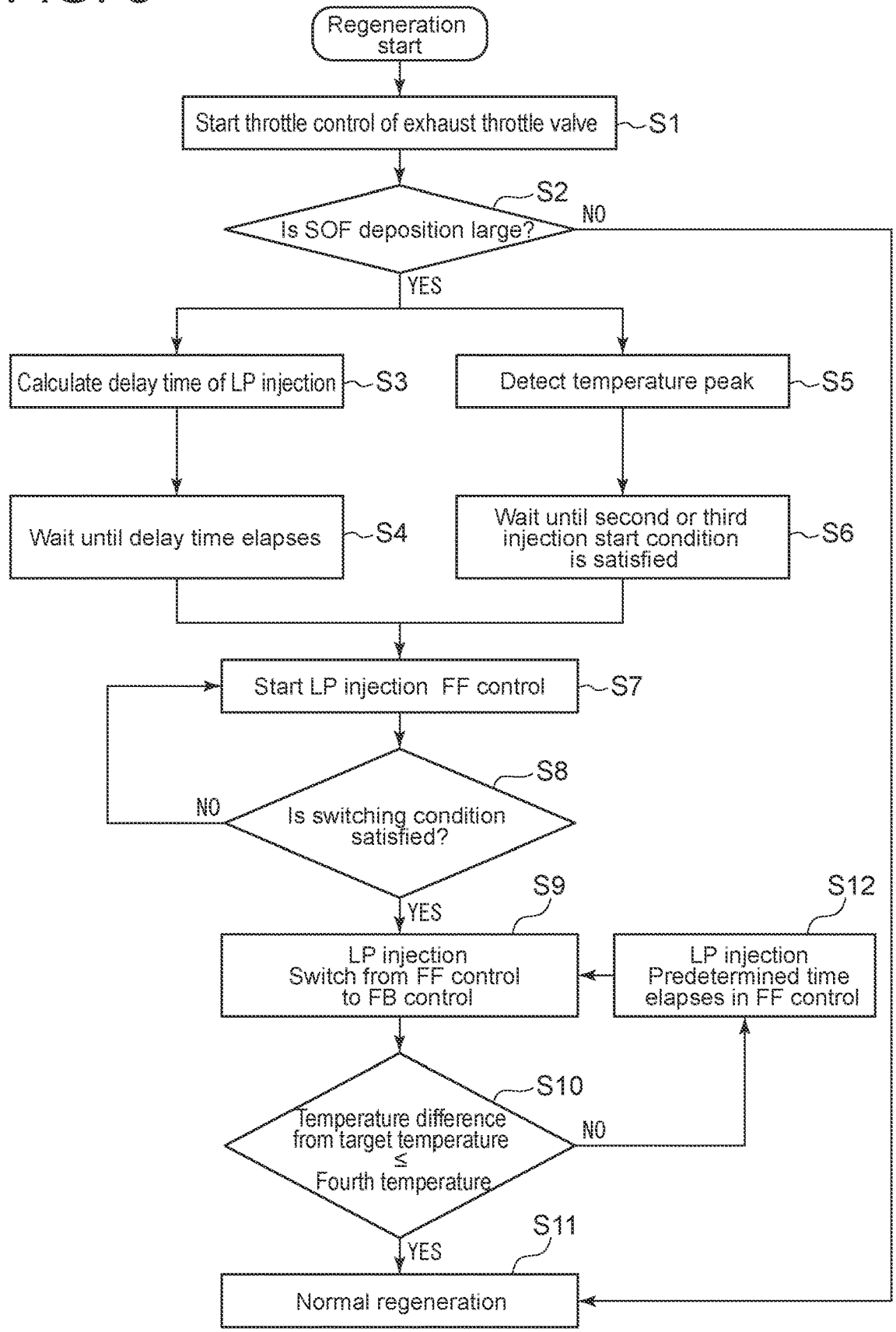
FIG. 3 is a flowchart executed by the ECU, and shows an exhaust gas treatment method of a diesel engine according to an embodiment of the present invention.

FIG. 3 is a flowchart executed by the ECU 10, and shows an exhaust gas treatment method of the diesel engine 1 according to an embodiment of the present invention (hereinafter, simply referred to as "control method according to the present embodiment"). The control method according to the present embodiment is for controlling execution of forced regeneration that removes PM deposited on the DPF 37 by increasing the temperature of the DPF 37 in the exhaust gas treatment device of the diesel engine 1 including the DOC 35 disposed in the exhaust passage 21 and the DPF 37 disposed downstream of the DOC 35. Since the control method according to the present embodiment is executed by the ECU 10, it will be described with reference to FIG. 2 as appropriate.

When the forced regeneration starts, the valve throttle unit 101 starts throttle control of the exhaust throttle valve 61 (step S1). As a result, the exhaust temperature starts rising. The exhaust temperature may be raised by, for instance, changing the early-post injection amount and injection timing, or changing the fuel injection rail pressure. Then, the determination unit 102 determines whether the SOF deposition amount on the DOC 35 is large, i.e., whether an injection start condition corresponding to the remaining SOF deposition amount on the DOC 35 is satisfied after the forced regeneration starts and after the upstream temperature of the DOC 35 reaches a predetermined temperature (step S2, determination step). The injection start condition in this context is synonymous with the injection start condition described in the determination unit 102.

If the SOF deposition amount is large (YES), in an embodiment of the present invention, two flows for determining whether the injection start condition is satisfied are performed in parallel. Specifically, the deposition condition determination unit 103 calculates a delay time of the start of the late-post injection (step S3). The delay time in this context is synonymous with the delay time described in the determination unit 102. Further, the injection execution unit 104 waits for the delay time from when the upstream temperature of the DOC 35 reaches a temperature (for example, 250° C.) at which the late-post injection should be performed (step S4, first injection start condition).

On the other hand, the deposition condition determination unit 103 detects a temperature peak caused by a decrease in downstream temperature of the DOC 35 after the temperature rise due to the start of forced regeneration (step S5). Then, the deposition condition determination unit 103 waits until at least one of the following injection start conditions is satisfied: the downstream temperature of the DOC 35 is equal to or lower than the second temperature (second injection start condition); or the temperature difference between the upstream temperature and the downstream temperature of the DOC 35 is equal to or lower than the third temperature (third injection start condition) (step S6).

Then, if any of the deposition conditions is satisfied, the injection execution unit 104 starts the late-post injection of fuel into the DOC 35 (step S7, injection execution step). The late-post injection is started by FF control of the fuel injection amount. Further, if at least one of the following switching conditions is satisfied (YES in step S8): a predetermined switching time elapses from the start of injection of fuel (first switching condition); or the upstream temperature of the DPF 37 reaches a predetermined switching temperature (second switching condition), the injection execution unit 104 switches the late-post injection from FF control to FB control (step S9). Until the switching condition is satisfied (NO in step S8), FF control is performed.

After the FB control starts, if the temperature difference between the upstream temperature of the DPF 37 and a target temperature is equal to or lower than the fourth temperature (YES in step S10), it is determined that excessive temperature rise of the DPF 37 due to SOF oxidation heat generation at the DOC 35 is suppressed, and the injection execution unit 104 performs normal regeneration (step S11). On the other hand, after the FB control starts, if the temperature difference between the upstream temperature of the DPF 37 and a target temperature exceeds the fourth temperature (NO in step S10), the FF control is performed again (step S12). The FF control is performed for a predetermined time, and is switched to FB control after the predetermined time elapses (step S9).

Figure 4:
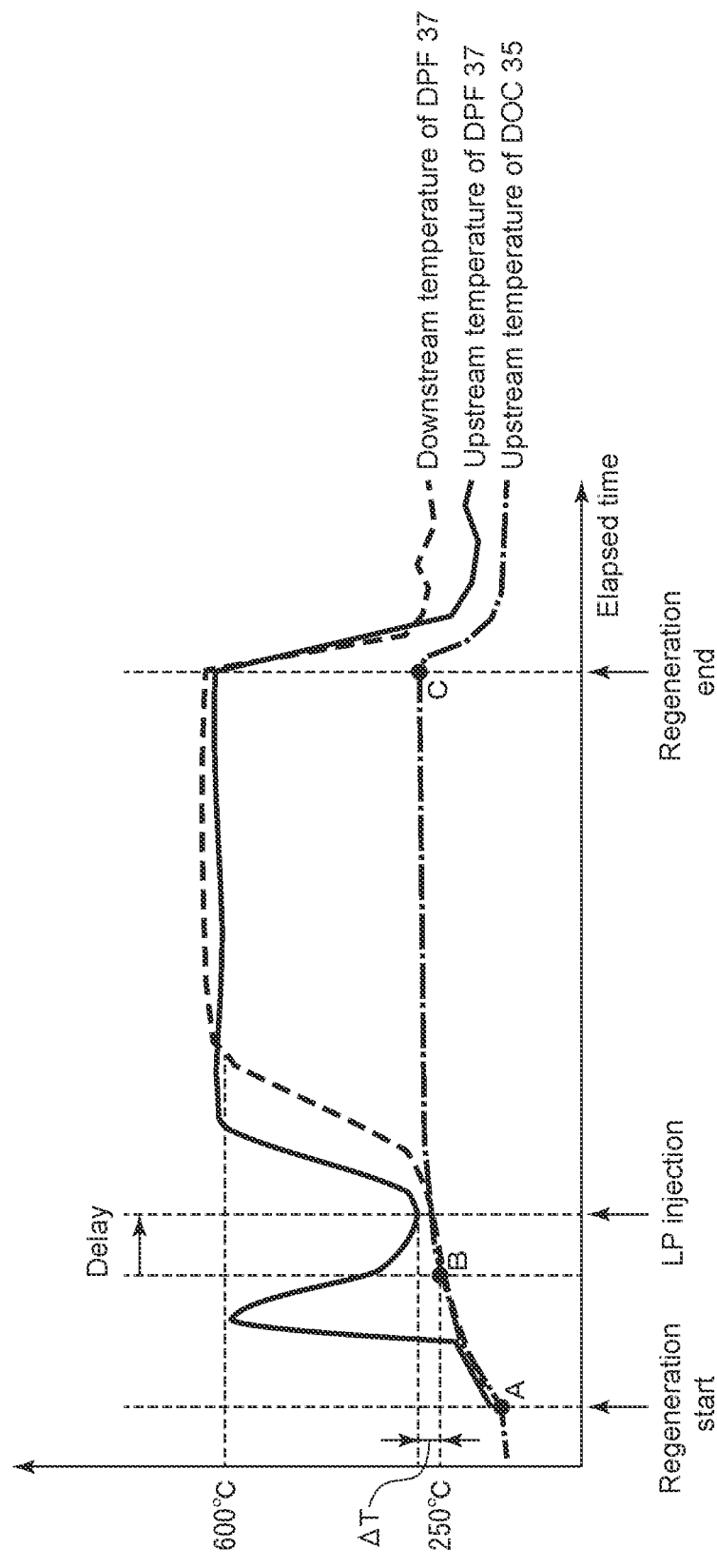
FIG. 4 is a graph showing temperature change over time.

FIG. 4 is a graph showing temperature change over time. The solid line represents the upstream temperature of the DPF 37, the dash-dotted line represents the upstream temperature of the DOC 35, and the dashed line represents the downstream temperature of the DPF 37. When the forced regeneration of the DPF 37 starts, the upstream temperature of the DOC 35 starts rising (point A). Then, before the upstream temperature of the DOC 35 reaches 250° C. (predetermined temperature) (point B) having a sufficient catalytic activity for the late-post injection, SOF oxidation heat generation at the DOC 35 begins to occur. As a result, the downstream temperature of the DOC 35, i.e., the upstream temperature of the DPF 37 rises. However, at this point, the late-post injection of fuel into the DOC 35 is not performed as described above. Therefore, the upstream temperature of the DPF 37 is suppressed to 600° C. or lower, and excessive temperature rise of the DPF 37 is suppressed.

When the remaining SOF deposition amount on the DOC 35 decreases to some extent, the amount of oxidation heat decreases, and the downstream temperature of the DOC 35, i.e., the upstream temperature of the DPF 37 drops. Therefore, in an embodiment of the present invention, the late-post injection is started when the temperature peak is exceeded and the temperature difference between the upstream temperature and the downstream temperature of the DOC 35 is ΔT. By the late-post injection, the injected fuel is oxidized and heated at the DOC 35, and the downstream temperature of the DOC 35, i.e., the upstream temperature of the DPF 37 rises again. Further, soot is combusted at the DPF 37, and the downstream temperature of the DPF 37 also rises. Then, after a sufficient time elapses from the start of the late-post injection, the forced regeneration is completed (point C), and the temperature drops.

With the above-described control method, even when the upstream temperature of the DOC 35 reaches a predetermined temperature at which the late-post injection should be performed, the late-post injection is waited until the injection start condition is satisfied thereafter, so that the start of the late-post injection can be delayed. Thus, by setting an appropriate injection start condition such that the late-post injection is performed after SOF oxidation heat generation at the DOC 35 has settled down, it is possible to suppress excessive temperature rise of the DPF.

In particular, the upstream temperature controllability of the DPF 37 is improved even during regeneration after a long period of low-load operation in which a large amount of SOF is deposited on the DOC 35, and the risk of combustion of the DPF 37 due to excessive temperature rise of the DPF 37 can be reduced. As a result, the regeneration interval can be extended by increasing the allowable soot deposition amount on the DPF 37, so that the fuel consumption can be improved, and the oil dilution risk can be reduced by reducing the regeneration frequency.

REFERENCE SIGNS LIST

1 Diesel engine
3 Exhaust turbine
5 Compressor
7 Turbocharger
9 Intake passage
11 Intake throttle valve
13 Intake manifold
15 Intake port
19 Fuel injection valve
21 Exhaust passage
23 Pipe
25 Valve
29 Exhaust port
33 Exhaust gas treatment device
39 Combustion chamber
48, 49 Upstream temperature sensor
50 Sensor
52 Upstream pressure sensor
54 Downstream pressure sensor
56 Differential pressure sensor
61 Exhaust throttle valve
101 Valve throttle unit
102 Determination unit
103 Deposition condition determination unit
104 Injection execution unit

The invention claimed is:

1. A diesel particulate filter (DPF) regeneration control device for controlling execution of forced regeneration that removes PM deposited on a DPF by increasing a temperature of the DPF in an exhaust gas treatment device of a diesel engine including a diesel oxidation catalyst (DOC) disposed in an exhaust passage and the DPF disposed downstream of the DOC, the DPF regeneration control device comprising:
a determination unit for determining whether an injection start condition corresponding to a remaining soluble organic fraction (SOF) deposition amount on the DOC is satisfied after the forced regeneration starts and after an upstream temperature of the DOC reaches a predetermined temperature; and
an injection execution unit for starting late-post injection of fuel to the DOC when the injection start condition is satisfied,
wherein the injection start condition includes a first injection start condition such that a time from when the upstream temperature of the DOC reaches a first temperature to when the late-post injection starts is equal to or longer than a delay time set according to the remaining SOF deposition amount on the DOC, the delay time being set longer as the SOF deposition amount increases.

2. The DPF regeneration control device according to claim 1, further comprising a deposition condition determination unit for determining whether a deposition condition that a SOF deposition amount on the DOC exceeds a predetermined deposition amount is satisfied.

3. The DPF regeneration control device according to claim 2,
wherein the deposition condition determination unit is configured to determine whether the deposition condition is satisfied, based on a SOF deposition index obtained by multiplying a weighting coefficient set according to the upstream temperature of the DOC by an operating time of the diesel engine.

4. The DPF regeneration control device according to claim 3,
wherein, with a reference temperature on an upstream side of the DOC as a boundary, the weighting coefficient includes a negative weighting coefficient when an upstream temperature is higher than the reference temperature, and the weighting coefficient includes a positive weighting coefficient when the upstream temperature is lower than the reference temperature.

5. The DPF regeneration control device according to claim 1,
wherein the injection start condition includes at least one of:
a second injection start condition that a downstream temperature of the DOC is equal to or lower than a second temperature; or
a third injection start condition that a temperature difference between the upstream temperature and the downstream temperature of the DOC is equal to or lower than a third temperature.

6. The DPF regeneration control device according to claim 5,
wherein at least one of the second temperature or the third temperature includes a temperature that is reached when the downstream temperature of the DOC rises due to start of the forced regeneration and then drops.

7. A diesel particulate filter (DPF) regeneration control device for controlling execution of forced regeneration that removes PM deposited on a DPF by increasing a temperature of the DPF in an exhaust gas treatment device of a diesel engine including a diesel oxidation catalyst (DOC) disposed in an exhaust passage and the DPF disposed downstream of the DOC, the DPF regeneration control device comprising:
a determination unit for determining whether an injection start condition corresponding to a remaining soluble organic fraction (SOF) deposition amount on the DOC is satisfied after the forced regeneration starts and after an upstream temperature of the DOC reaches a predetermined temperature; and
an injection execution unit for starting late-post injection of fuel to the DOC when the injection start condition is satisfied,
wherein the injection execution unit is configured to perform feedforward (FF) control of a fuel injection amount until a switching condition is satisfied, and the injection execution unit is configured to switch to feedback (FB) control when the switching condition is satisfied.

8. The DPF regeneration control device according to claim 7,
wherein the switching condition includes at least one of:
a first switching condition that a predetermined switching time elapses from start of injection of the fuel; or
a second switching condition that an upstream temperature of the DPF reaches a predetermined switching temperature.

9. The DPF regeneration control device according to claim 7,
wherein the injection execution unit is configured to perform the FF control again when a temperature difference between an upstream temperature of the DPF and a target temperature exceeds a fourth temperature after the FB control starts.

10. A DPF regeneration control method for controlling execution of forced regeneration that removes PM deposited on a DPF by increasing a temperature of the DPF in an exhaust gas treatment device of a diesel engine including a DOC disposed in an exhaust passage and the DPF disposed downstream of the DOC, the DPF regeneration control method comprising:
- a determination step of determining whether an injection start condition corresponding to a remaining SOF deposition amount on the DOC is satisfied after the forced regeneration starts and after an upstream temperature of the DOC reaches a predetermined temperature; and
- an injection execution step of starting late-post injection of fuel to the DOC when the injection start condition is satisfied,
- wherein the injection start condition includes a first injection start condition such that a time from when the upstream of the DOC reaches a first temperature to when the late-post injection starts is equal to or longer than a delay time set according to the remaining SOF deposition amount on the DOC, the delay time being set longer as the SOF deposition amount increases.

* * * * *